May 27, 1952
H. B. DAWSON
2,598,113
VEHICLE TRANSPORT UNIT
Filed July 5, 1949
2 SHEETS—SHEET 1
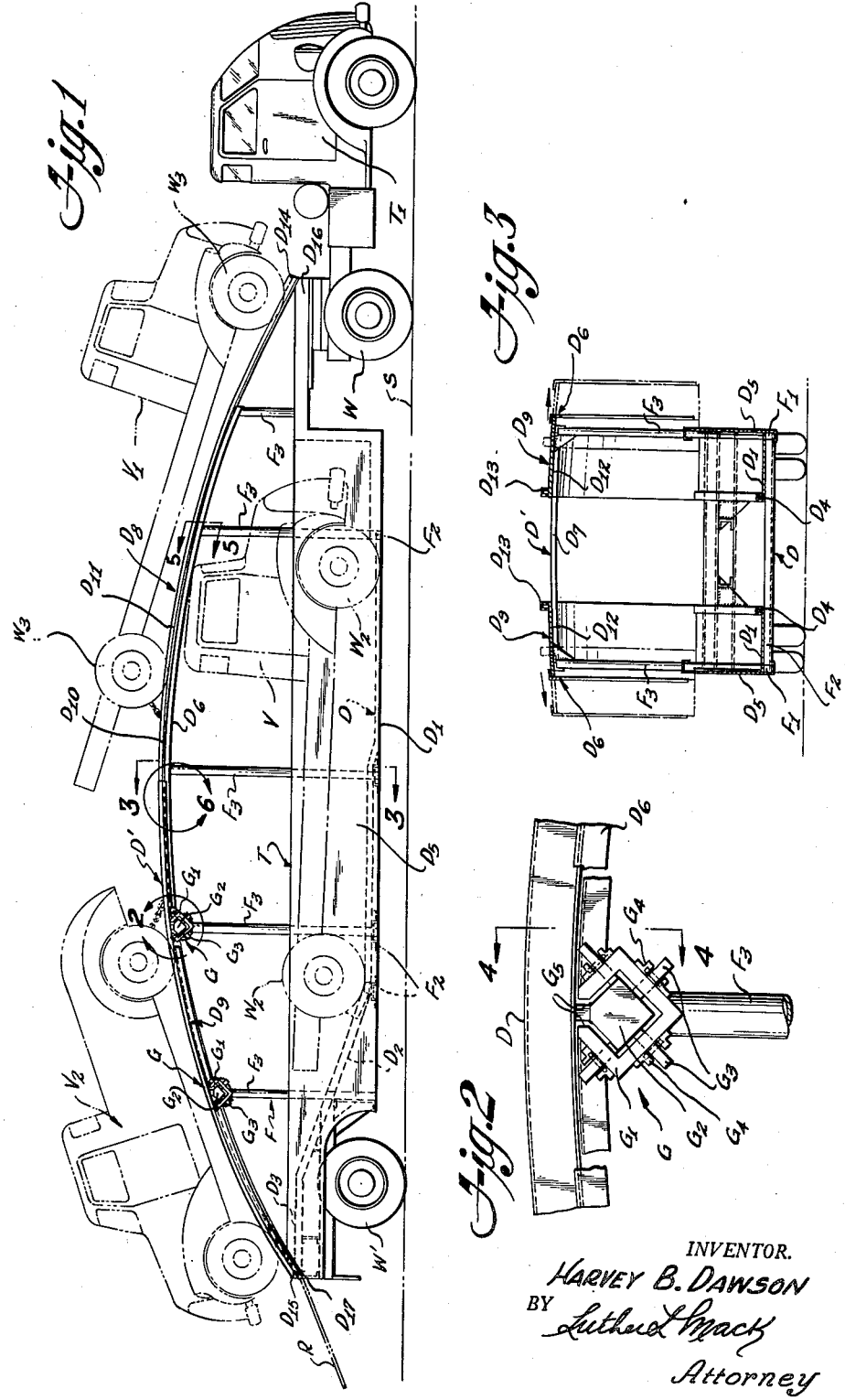
INVENTOR.
HARVEY B. DAWSON
BY
Luther L. Mack
Attorney May 27, 1952   H. B. DAWSON   2,598,113
VEHICLE TRANSPORT UNIT
Filed July 5, 1949   2 SHEETS—SHEET 2

INVENTOR.
HARVEY B. DAWSON
BY Luther L. Mack
Attorney

Patented May 27, 1952

2,598,113

UNITED STATES PATENT OFFICE 2,598,113

VEHICLE TRANSPORT UNIT

Harvey B. Dawson, El Monte, Calif.

Application July 5, 1949, Serial No. 103,000

2 Claims. (Cl. 296—1)

This invention relates to and has for a primary object the provision of an improved truck transport trailer or vehicle by means of which a plurality of trucks of the same or different size may be loaded on and unloaded from a trailer expeditiously and safely with a minimum of labor and cost and by means of a more simple and economical structure than heretofore employed for such purpose.

Due to the more or less limited clearance beneath highway overpasses, viaducts and other crossings, entries to buildings, overhead wires, etc., it is an important object to provide a transport trailer formed with an underslung lower deck and an arched upper deck affording ample clearance therebelow to accommodate trucks having cabs of maximum height and other trucks of maximum or less overall height in such a manner that at least two trucks may be supported on the arched upper decks facing in opposite directions with their cabs extended above the lowermost end portions thereof so as to afford a minimum of overall height and thus assure clearance of a loaded trailer when passing through locations of less than maximum or ordinarily sufficient clearance.

The loading and unloading of vehicle transport trailers requires special ramps over which the vehicles are moved into riding position on the upper and lower decks of a transport vehicle and also frequently either the complete detachment of a portion of the upper deck to permit loading of the lower deck or if the decks are horizontally disposed in different horizontal planes the vehicles must be loaded from platforms of correspondingly different elevation.

Necessarily, the lowest possible vehicle receiving plane over the rear wheels is substantially higher than the lowest permissible deck plane between the front and rear wheels and it is desirable to provide an underslung lower deck in a plane as near the ground as is possible in order to prevent undue topheaviness and reduce the overall height of the trailer and its load to a minimum. Hence, in such case, because of the substantially higher elevation of the rear approach to the lower deck and the downwardly sloped rear portion of the arched upper deck, it is necessary and an important object to provide means for slidably supporting the rear sloping portion of the upper deck so that such portion may be laterally extended to a position out of interference with a vehicle in process of being loaded on the lower deck without, however, detaching said upper deck portion.

Consequently, it is an object to provide means on the trailer frame for slidably supporting a section of the upper deck for movement between load carrying position to vehicle clearing position.

Other objects may appear as the description of my invention progresses.

I have shown a preferred form of transport trailer embodying my improvements in the accompanying drawings, subject to modification, within the scope of the appended claims, without departing from the spirit of the invention. In said drawings:

Fig. 1 is a side elevational view of a transport trailer of my improved design shown hitched to a suitable tractor;

Fig. 2 is an enlarged end view of a suitable type of sliding support for a section of the upper deck embraced within the arcuate line 2 of Fig. 1;

Fig. 3 is a sectional elevation of the trailer on line 3—3 of Fig. 1;

Figure 4:
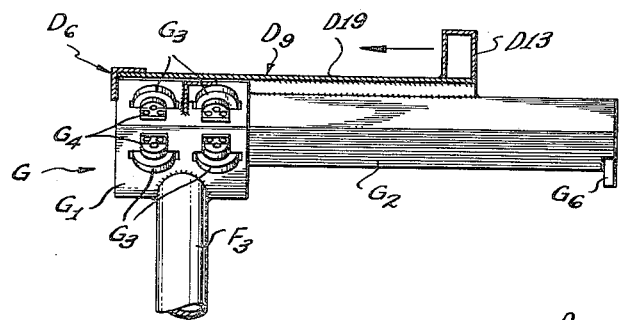
Fig. 4 is a side elevational view of the structure of Fig. 2 as viewed in the plane of line 4—4 of Fig. 2.
Figure 5:
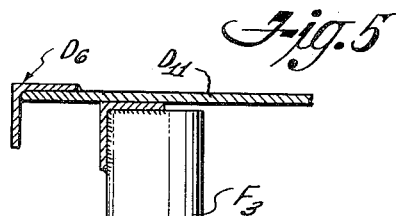
Fig. 5 is a fragmentary sectional view of the deck frame on line 5—5 of Fig. 1.

Briefly described, the structure of my invention includes a substantially elongated trailer T adapted to be hitched to and drawn over highways by means of a tractor T' for the purpose of transporting a plurality of vehicles as at V, $V_1$ and $V_2$ from points of origin or depots to points of disposition, as for instance while a large vehicle V is loaded on the lower deck D and other vehicles, as at $V_1$ and $V_2$ are borne by an upper deck D'.

The decks D and D' are mounted on a suitable fabricated rigid frame F the details of which, except as may be hereinafter explained, are not important. Lower deck D has a main horizontal forward section which is underslung to a plane as close as practicable to the supporting surface S and is subdivided to provide parallel laterally spaced runways $D_1$, $D_1$. Said runways extend from points slightly rearwardly of front wheels W, W to points slightly forwardly of rear wheels W', W', and thence upwardly on inclined planes as at $D_2$ to a common plane above wheels W', W', and rearwardly in a horizontal plane, as at $D_3$ to the rear end of the vehicle.

At the inner margins of runways $D_1$, $D_1$, I provide wheel guides $D_4$, $D_4$ between which and outer side panels $D_5$, $D_5$ the wheels $W_2$ of a vehicle, as at V, are guided as said vehicle is moved onto or off of deck D.

Frame F includes suitable longitudinal members $F_1$, $F_1$, transverse members $F_2$, $F_2$ and upright members $F_3$, $F_3$, etc., suitably secured together to provide a rigid structure for supporting decks D and D'. Said frame includes laterally spaced arched longitudinal members $D_6$, $D_6$ secured to uprights $F_3$ and cross connecting members $D_7$, $D_7$, etc., all of which are rigidly connected to provide a support for a fixed forward section $D_8$ and rearward extensible and retractable sections $D_9$, $D_9$ of upper deck D'. Fixed deck section $D_8$ has parallel laterally spaced runways $D_{10}$, $D_{10}$ with wheel guides $D_{11}$ at their inner and outer margins between which the wheels $W_3$ of the forwardmost vehicle $V_1$ run as the vehicle is loaded on or unloaded from the trailer.

The adjustable portion of the upper deck D' is formed of two mating sections $D_9$, $D_9$ which, as shown in Fig. 3 in broken lines, are extensible laterally and outwardly in opposite directions from vehicle supporting positions so as to permit movement of a vehicle V onto and off of lower deck D, but when retracted to position for supporting a vehicle $V_2$, the two sections are arranged together as a common continuation of fixed section $D_8$ and with their runways $D_{12}$ and wheel guides $D_{13}$ longitudinally aligned.

It will be noted by reference to Fig. 1 that upper deck D' is substantially arched with its peak on a radial upright line midway of the front and rear ends of the trailer T and on such a radius that the front and rear ends $D_{14}$ and $D_{15}$, respectively, of the deck are disposed in a common horizontal plane at the front $D_{16}$ and rear $D_{17}$ of the trailer. Thus, when a portable ramp R is provided at the rear of the trailer, the deck sections $D_9$, $D_9$ having been first opened and outwardly extended, the vehicle V may be driven onto deck D to the position shown in dotted lines in Fig. 1. Thereafter, the upper deck sections $D_9$, $D_9$ having been retracted and closed, the vehicles $V_1$ and $V_2$ may be driven from ramp R on upper deck D' to the positions shown.

As shown in Figs. 1 and 2, I provide special means on frame F for movably supporting the upper deck sections $D_9$, $D_9$ for extension and retraction. Said means includes tracks or guides G, G, of which there are two as shown, but there may be as many as desired arranged transversely of frame F at points slightly below the level of deck D'. Said guides comprise hollow members $G_1$ of square cross sectional form suitably fixed to the upper ends of frame members $F_3$, as shown, or to other portions of the frame and bars $G_2$ also of square cross sectional form of smaller size than the interior of members $G_1$. The deck sections $D_9$ are readily moved over the guides and rendered frictionless by means of sets of rollers $G_3$ rotatably borne by bearings $G_4$ which are fixed to the outer sides of members $G_1$ and arranged so that the rollers will project through slots in the four sides of the guides into engagement with corresponding sides of bars $G_2$. Bars $G_2$ are welded or otherwise secured to transverse members $D_7$ of deck sections $D_9$ and are inserted in guides $G_1$ by longitudinally moving the same with the members $D_7$ moving through longitudinal openings $G_5$ in members $G_1$.

Figure 6:
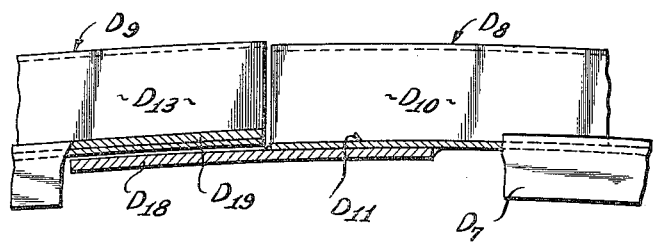
Fig. 6 is a fragmentary view, partly in section, at the junction of the fixed and movable deck sections embraced within the area of arcuate line 6 of Fig. 1.

As shown in Fig. 6, there is provided a flat transversely disposed plate $D_{18}$ beneath and welded to runway plates $D_{11}$, $D_{11}$ of upper deck section $D_8$ and preferably seam welded to plates $D_{11}$. Plate $D_{18}$ projects rearwardly from the margins of plates $D_{11}$ and underlies the runway plates $D_{19}$ of adjustable deck sections $D_9$.

Referring particularly to Fig. 4, it will be noted that bars $G_2$ have stop lugs $G_6$ fixed to the inner ends thereof which are adapted to engage the inner ends of guides $G_1$ when sections $D_9$ are moved outwardly and thus serve to limit the movement of sections $D_9$ to an extent where the runways $D_{19}$ will be retracted sufficiently to permit a vehicle V being moved onto or from the lower deck D.

It is important to note that the vehicles $V_1$ and $V_2$ are so positioned on the upper deck that the cabs or tallest points will be on the lowest sloping arcs of the deck. Thus, vehicles of the same or different character and size may be driven onto the deck either forwardly or backwardly, or facing in opposite directions in order to move compactly, conveniently and safely load the trailer T.

It may be understood that the loading, transporting and unloading of trucks are different problems from those presented in the transporting of smaller passenger vehicles and, therefore, trucks require special means and methods of transport and handling to meet variable highway and structural conditions.

The herein disclosed transport trailer is essentially novel and efficient because of the presence of the arched upper deck, the extensibility rather than the complete removal or swinging of a movable upper deck section into and from vehicle supporting position, and the economical yet entirely convenient and practical means for extending and retracting the movable upper deck sections manually with a minimum of effort and the absence of power operated means therefor.

I claim:

1. A vehicle transporting unit comprising: a structure arranged with traction wheels for movement over a highway; a main deck formed with runways for supporting vehicles to be transported on said unit; an upper deck formed of relatively fixed and laterally adjustable sections for supporting other vehicles thereon; means for movably supporting the adjustable sections of the upper deck for extension in opposite directions laterally out of positions of interference with vehicles as they are loaded on and unloaded from positions on the main deck, the supporting means for the movable deck sections including sets of transverse guides borne by said structure and composed of relatively stationary and slidable members telescopically arranged to prevent their disconnection; and frictionless bearings borne by corresponding guide members and engageable with the associated guide members.

2. A vehicle transport unit comprising: a structure arranged with traction wheels for movement over a highway; a main deck formed with runways for supporting vehicles to be transported on said unit; an upper deck formed of relatively fixed and movable sections for supporting other vehicles thereon; means for movably supporting certain sections of the upper deck for extension laterally in opposite directions out of positions of interference with vehicles as they are loaded on and unloaded from positions on the main deck, the supporting means for the movable deck sections including sets of transverse guides borne by said structure and composed of relatively stationary and slidable members telescopically arranged; and frictionless bearings borne by corresponding guide members and engageable with the associated guide members, a guide member of each set having a stop device for engagement with a stationary part of the structure for limiting the outward extension of the movable upper deck sections to predetermined points.

HARVEY B. DAWSON.

REFERENCES CITED

The following references are of record in the file of this patent:

UNITED STATES PATENTS

| Number | Name | Date |
|---|---|---|
| 1,809,557 | Lishon | June 9, 1931 |
| 2,146,567 | Dondlinger | Feb. 7, 1939 |